(12) United States Patent
Lancaster-Larocque (10) Patent No.: US 9,135,543 B2
(45) Date of Patent: Sep. 15, 2015

(54) COMPRESSION AND OBFUSCATION OF THREE-DIMENSIONAL CODING

(75) Inventor: Simon Regis Louis Lancaster-Larocque, Gloucester (CA)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 13/528,487

(22) Filed: Jun. 20, 2012

(65) Prior Publication Data

US 2013/0341400 A1    Dec. 26, 2013

(51) Int. Cl.
| G06K 7/10 | (2006.01) |
| G06K 19/06 | (2006.01) |
| A61J 3/00 | (2006.01) |
| B41M 5/26 | (2006.01) |

(52) U.S. Cl.
CPC .......... *G06K 19/06037* (2013.01); *A61J 3/007* (2013.01); *G06K 19/06159* (2013.01); *G06K 19/06178* (2013.01); *G06K 19/06187* (2013.01); *B41M 5/26* (2013.01)

(58) Field of Classification Search
CPC .......... G06K 19/06037; G06K 19/06159; G06K 19/06187; B41M 5/26; A61J 3/007
USPC .......... 235/454, 375, 462.01; 372/26; 704/7; 382/135
See application file for complete search history.

(56) References Cited

U.S. PATENT DOCUMENTS

| 5,235,169 | A * | 8/1993 | Wakaumi et al. | 235/462.01 |
| 5,635,269 | A | 6/1997 | Weir et al. | |
| 5,880,430 | A | 3/1999 | Wein | |
| 2007/0241177 | A1 * | 10/2007 | Tuschel et al. | 235/375 |
| 2009/0141961 | A1 * | 6/2009 | Smith et al. | 382/135 |
| 2009/0171654 | A1 * | 7/2009 | Spain | 704/7 |
| 2010/0054287 | A1 * | 3/2010 | Ghauri | 372/26 |
| 2010/0176195 | A1 * | 7/2010 | Kubota et al. | 235/380 |
| 2011/0188051 | A1 * | 8/2011 | Stuck et al. | 356/511 |
| 2012/0037695 | A1 * | 2/2012 | Liu et al. | 235/375 |
| 2012/0181329 | A1 * | 7/2012 | Gratton et al. | 235/375 |
| 2013/0118048 | A1 | 5/2013 | Kawanami | |
| 2014/0061172 | A1 | 3/2014 | Kuo | |

FOREIGN PATENT DOCUMENTS

| DE | 4106151 | 11/1991 |
| JP | H09296589 | 11/1997 |
| JP | 2001270300 | 10/2001 |

* cited by examiner

*Primary Examiner* — Steven S Paik
*Assistant Examiner* — Asifa Habib
(74) *Attorney, Agent, or Firm* — Brownstein Hyatt Farber Schreck, LLP (57) ABSTRACT

Systems and methods related to three-dimensional coding are disclosed. In one embodiment, a method for encoding data is described that includes generating a pattern in a substrate. The pattern includes elements and each element has one of an aperture or a protrusion. The aperture or protrusion has unique x, y coordinates within the pattern. The method also includes varying a depth of at least one element. The varied depth encodes data.

17 Claims, 10 Drawing Sheets

COMPRESSION AND OBFUSCATION OF THREE-DIMENSIONAL CODING

TECHNICAL FIELD

The present application relates generally to coding techniques and, more specifically, to techniques implementing three-dimensional coding.

BACKGROUND

Codes convey information. The information is extracted from the code by following a set of rules that convert the code into an intelligible form. Some common codes include barcodes, such as universal product codes (UPC), and matrix codes, such as QR codes. Bar codes have one-dimensional encoding, while QR codes have two-dimensional coding. The codes may allow a relatively large amount of information to be communicated within a relatively small amount of space. Additionally, these codes inherently limit access to the encoded information as they are not intelligible without a reader operating software that knows how to decode the information. As such, the codes are not commonly obscured. Indeed, to the contrary, with the rising popularity of smartphones and other portable devices that include cameras, such codes have become common in the marketplace. In particular, it is common to see codes on displays, flyers and other promotional materials that allow a user to capture an image and receive additional information, a link to a website, and/or discounts, for example. Generally, these materials are more concerned about communicating additional information than their appearance.

SUMMARY

Systems and methods related to three-dimensional (3-D) coding are disclosed. The three-dimensional codes provide higher density encode. Additionally, some embodiments provide codes that are too small to be seen by the naked eye. As such, they maybe placed on surfaces of an aesthetically appealing device without interrupting the appearance.

In one embodiment, a method for encoding data is described that includes generating a pattern in a substrate. The pattern includes elements and each element has one of an aperture or a protrusion. The aperture or protrusion has unique x, y coordinates within the pattern. The method also includes varying a depth of at least one element. The varied depth encodes data.

Another embodiment may take the form of a 3-D code having plurality of apertures formed within a substrate. Each aperture includes a unique position in the 3-D code relative to each of the other apertures. Additionally, each aperture has a depth parameter and at least one aperture has a depth that is different from at least one other aperture's depth.

Yet another embodiment may take the form of a method of reading a 3-D code. The method may include determining a relative location of a reader and a device having a 3-D code and orienting the reader relative to the device to enable reading of the 3-D code. Additionally, the method includes obtaining an image of the 3-D code and processing the image to determine a relative location of each element of the 3-D code. The method also includes determining a depth of each element of the 3-D code.

While multiple embodiments are disclosed, still other embodiments of the present invention will become apparent to those skilled in the art from the following Detailed Description. As will be realized, the embodiments are capable of modifications in various aspects, all without departing from the spirit and scope of the embodiments. Accordingly, the drawings and detailed description are to be regarded as illustrative in nature and not restrictive.

DETAILED DESCRIPTION

Three-dimensional (3-D) coding is described, including techniques for creating the 3-D codes and techniques for reading the 3-D codes. Generally, the 3-D codes may be encoded in an x-y plane, as well as in a z-direction. That is, position and space of code elements within a plane may encode information, and a depth of the elements may additionally encode information. The codes may include more information per square inch over conventional coding techniques. Hence, the codes may be compressed or more compacted than conventional codes.

In some embodiments, the 3-D codes may be formed using mechanical techniques to deform material and create a pattern. For example, in one embodiment, a pin-stamping technique may be implemented that includes pounding material to generate a 3-D code pattern. The force applied by the pin-stamp may be adjusted to provide a varied depth for each element of the code. In other embodiments, a laser may be used to laser ablate material to form the pattern. Operation parameters such as frequency, intensity and/or exposure time may be varied to achieve varied depths of the pattern elements.

Various other techniques may be implemented in addition to the spacing, positioning and the depth of the pattern elements to further provide higher informational density. For example, a shape of each element of the 3-D codes may be varied. That is, for example, circular shapes, rectangular shapes, triangular shapes, hexagonal shapes, and so forth, may be utilized for encoding particular elements. In some embodiments, the shapes may be provided at a surface of the elements or along the depth of the elements. In other embodiments, the element may have a first shape and a second shape may be provided at the bottom of the element.

The 3-D codes may be provided on electronic device housings to help track the device during and/or after manufacture. In particular, the 3-D coding may identify electronic devices including, but not limited to, media players, computers, televisions, mobile phones, and so forth. One particular use of the 3-D codes is to help identify counterfeit products, as only authentic products may have a proper 3-D code. Non-authentic (e.g., counterfeit or imitation) products may not even include any codes. If they do include a code, counterfeit products may be detected based on the coding (or non-coding) of the varied depth of the code elements.

In some embodiments, the 3-D codes may be obfuscated or hidden from view so as to not detract from an aesthetic appeal of the electronic devices. Indeed, the 3-D codes may be hidden behind an obscuring feature or within a character or logo printed on the device. In other embodiments, the 3-D code may be too small to be seen by a naked eye. As such, the 3-D codes may be positioned in nearly any location of the device.

Figure 1A:
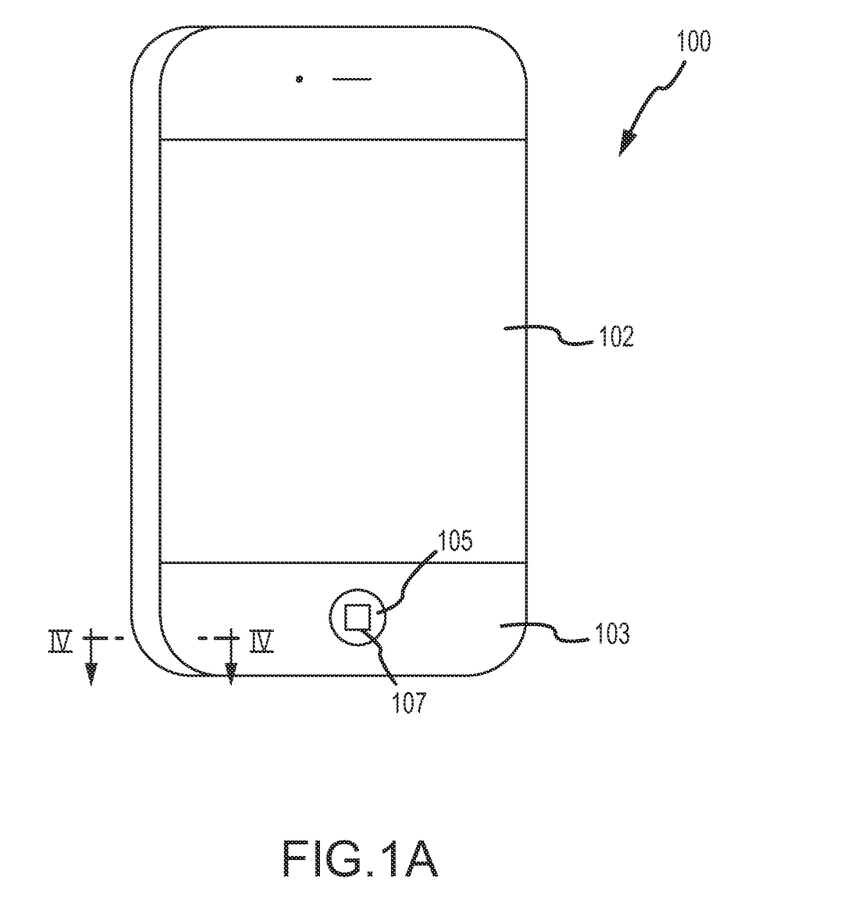
FIG. 1A illustrates an example electronic device.

Turning to the drawings and referring initially to FIG. 1A, an example electronic device 100 on which the 3-D coding may be utilized is illustrated. In particular, the electronic device 100 is illustrated as a smartphone, such as an iPhone® manufactured by Apple, Inc. The electronic device 100 may include a cover glass 102 on which or under which a 3-D code may be located. That is, the 3-D code may be integrated into the cover glass 102 or under the cover glass. In one example, the code may be located under an ink coated portion 103 of the cover glass 102 to obscure the code, as discussed in greater detail below. In another embodiment, the 3-D code may be located on a button 105. For example, the code may be located within a design 107 on the button 105.

Figure 1B:
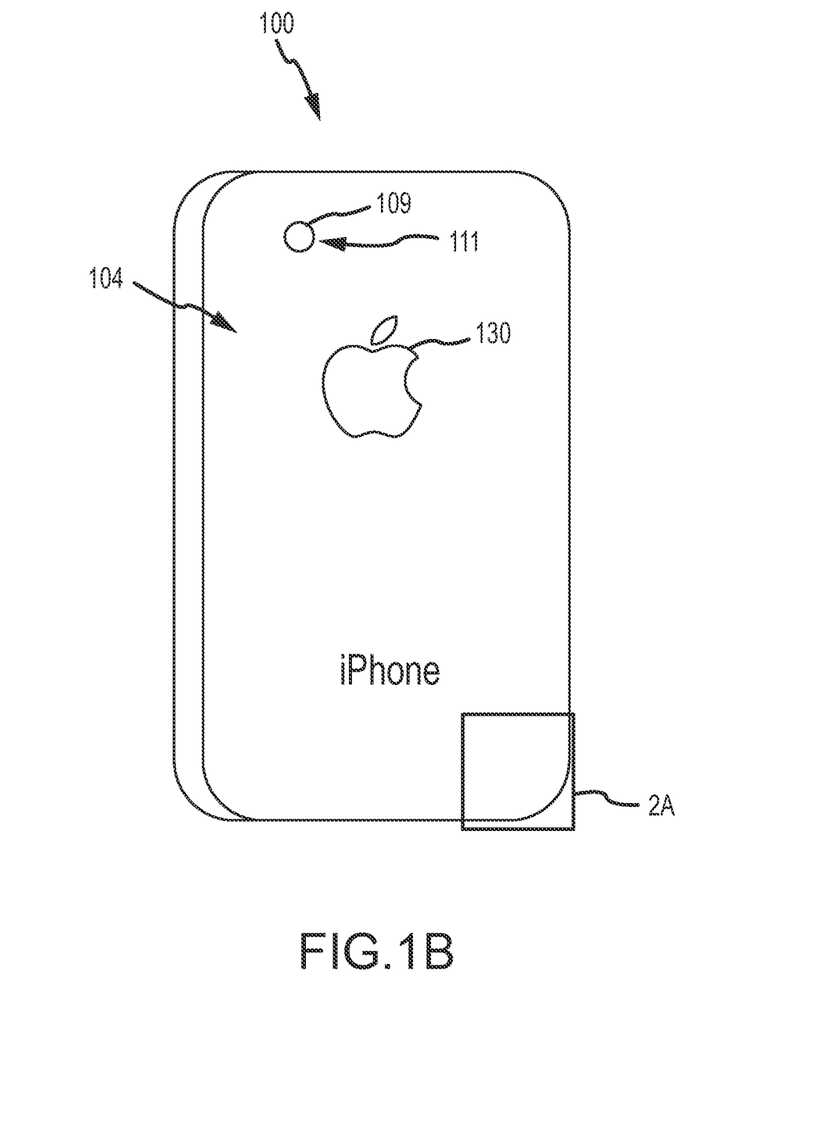
FIG. 1B illustrates a backside of the electronic device of FIG. 1A.

A 3-D code may also, or alternatively, be located on a backside 104 of the electronic device 100. FIG. 1B illustrates the backside 104 of the electronic device 100. The 3-D code may be created in a generally unused portion of an exposed component, such as an ink circle 109 of a camera 111. Such positioning may serve dual purposes of providing a known location for detection of the code, as well as obfuscating the presence of the code. In particular, when the code is so small that it is not detectable to the human eye, a macroscopic positioning feature may be provided (e.g., such as the ink circle or other feature) and a "zoom-in" may be performed to visualize the code. Hence, a tedious search for the code may be avoided. This is further discussed below.

In some embodiments, the code may obfuscated and not detectable or at least not easily detectable to the naked, human eye. Thus, the 3-D code may be positioned in nearly any location on the device 100 without diminishing or taking away from an aesthetic appearance of the device 100. Further, the 3-D code may be positioned within another feature of the device so that it may be obscured. For example, the 3-D code may be positioned within a letter of a brand name or within a logo printed on the surface of the device 100.

In other embodiments, the 3-D code may be sized so that it is detectable or visible on the device 100. The code may be consistently located in the same position on each device so that it may be found. For example, the code may be located in a lower, right corner on the backside of the device 100, such as the boxed area 2A in FIG. 1B. Alternatively, the code may be located within a known portion of a logo or lettering. In embodiments where the code is not visible to the naked eye, such positioning may help with obtaining a proper reading of the code and/or locating of the code.

The electronic device 100 may be made of material conducive to creation of the 3-D codes. For example, the electronic device 100 may include glass, plastic, metallic, and/or carbon fiber materials. Some materials may be more easily encoded using laser techniques, whereas others may be encoded using mechanical techniques, such as pin-stamping or mechanical milling. Metallic materials may be encoded using a pin-stamping and/or laser ablation techniques, while glass may be laser ablated and/or mechanically milled.

Figure 2A:
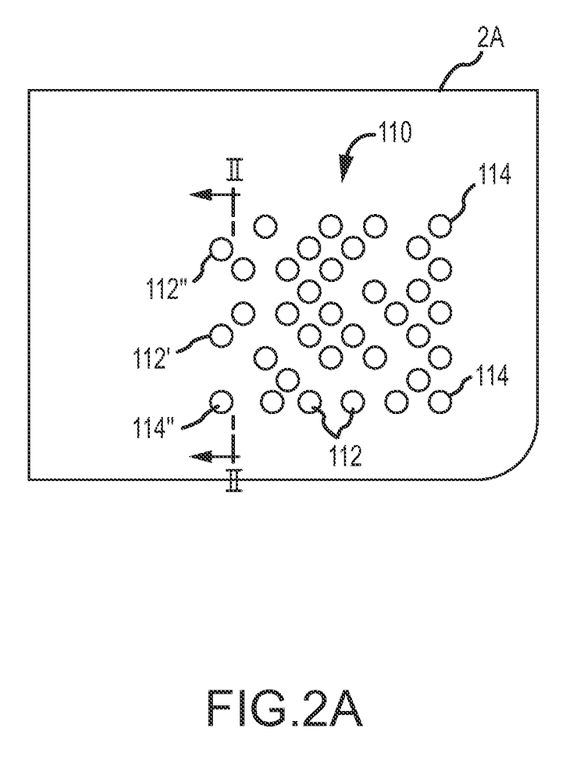
FIG. 2A is a zoomed portion of the backside of the electronic device illustrated in FIG. 1B showing an example pin stamped three-dimensional code.

FIG. 2A illustrates an example code 110 that may be pin-stamped into a surface of the electronic device 100. The code 110 may take the form of a number of elements 112 arranged in a pattern having absolute and/or relative positional significance. In particular, the location of each of the elements 112 within the code 110 may hold significance as well as the location of each element relative to other elements. Additionally, one or more orienting elements 114 may be utilized to help properly orient a code reader relative to the elements 112 of the code 110. It should be appreciated that the example code 110 is provided merely for illustrative purposes and may not be to scale and may not include the same number of elements as an actual code that may be implemented.

Figure 2B:
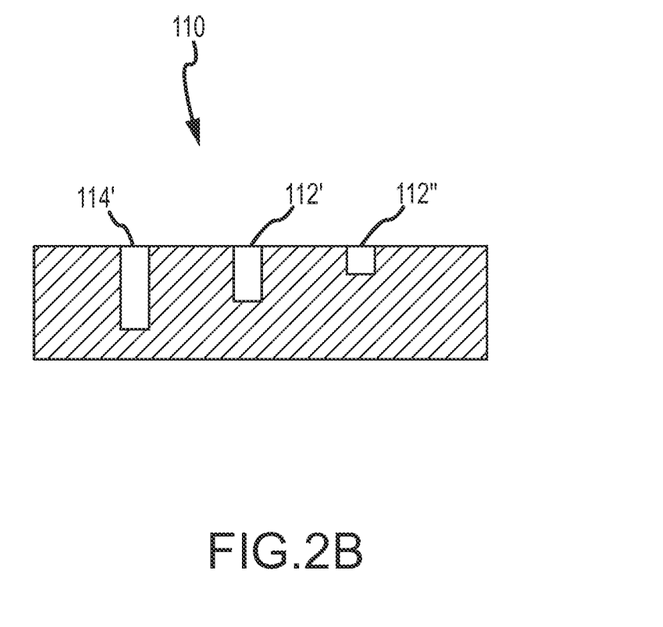
FIG. 2B is a cross-sectional view of the pin-stamped three-dimensional code taken along line II-II in FIG. 2A.

Each of the elements 112 in the code 110 may have a varied depth. The varied depth may further encode information. FIG. 2B is a cross-sectional image of the code 110 taken along line II-II. As may be seen, each of the elements 112 has a unique depth. In some embodiments, the depth may vary between two or three levels, as shown in FIG. 2A, whereas in other embodiments, many more levels may be encoded. The number of unique depths that the elements 112 may have is limited only by the depth resolution of a scanner used to read the code and the depth resolution of the encoding mechanism (e.g., laser, pin-stamp, and so forth). As such, higher resolution, 3-D scanners may allow a high number of various depth levels, and therefore allow for the density of information encoded into the code 110 to be higher.

The pin-stamped code 110 may be generated using any suitable pin-stamping tools. In some embodiments, the pin-stamped code 110 may be generated using a pneumatic tool with a head or probe that pounds a target material, such a device's metallic housing, to form the code. The tool may move relative to the material in a plane parallel to the surface of the device and may punch and deform the material of the device to create the coded pattern. The depth of each element may be varied by adjusting the force applied by the tool to create the elements 112. That is, the depth of each of the elements may vary depending upon the force applied by the tool during creation of the element. The force applied by the tool may be adjusted on the fly to achieve a desired depth for each element to create the 3-D code with varied depth. The tool may generally be able to achieve two to three uniquely distinguishable depth levels. This depends, however on the thickness of the material and the accuracy of the pin-stamp machine. If the material is thicker and/or the pin-stamp machine is more accurate, more uniquely distinguishable depth levels may be achieved.

In some embodiments, the pin-stamped code 110 may generally have a size on the order of a UPC code on conventional packaging. For example, the code may be approximately one inch square. Hence, the code 110 may be difficult to obscure and may be easily found. Although the code may easily be found, it may not be apparent that different elements 112 within the code have additional information encoded through the varying depth of the elements. As such, unsophisticated readers may not be able to fully and/or properly decode and interpret the code 110.

The code 110 may be read by any suitable device including, but not limited to a line scanner, a scanning microscope, an interferometer, or the like. The selected reader may be configured to determine spatial relationship of the elements, as well as the relative depth of the elements. In some embodiments, reading the code 110 may include generating a point cloud wherein each point in the point cloud indicates a 3-D position in x-y-z space that represents the surface of the code.

The points of the point cloud therefore define the location of each element within the code 110, as well as the depth of the element. That is, the points may include an x-y location as well as a z-location that indicates depth. Once the location and depth of each of the elements 112 is known, the code 110 may be decoded. As mentioned above, the depth resolution of the reader may limit the number of depth levels that may reasonably be discerned.

The size of a 3-D code generated through laser ablation may be on a much smaller scale than the code 110 formed through purely mechanical techniques and, therefore, affords greater opportunity compress the code, as well as hide or obfuscate the code. In particular, the laser ablated code may be obscured by, within or behind features of the electronic device, such as buttons, graphics printed on the device, and so forth. It should be appreciated that a fabrication method may both generate a visual graphic as well as the code. In other embodiments, the code may be generated by a different fabrication method than that used to create a graphic which includes or obscures the code. For example, a logo may be laser ablated and data may be laser encoded into the logo (e.g., on the entire logo or a portion of the logo).

In some embodiments, the code may be located under the cover glass 102. In other embodiments, the code may be located within a logo or a letter of a word printed on the electronic device 100. In still other embodiments, the code may be included as part of a microperforation region of the housing. As such, the laser ablated code may be on a scale that is not discernable or not easily detectable by the human eye. With the laser ablated code being so small, it may be placed in nearly any location on the device 100 without attracting a user's attention or negatively impacting an aesthetic appearance of the device.

Figure 3A:
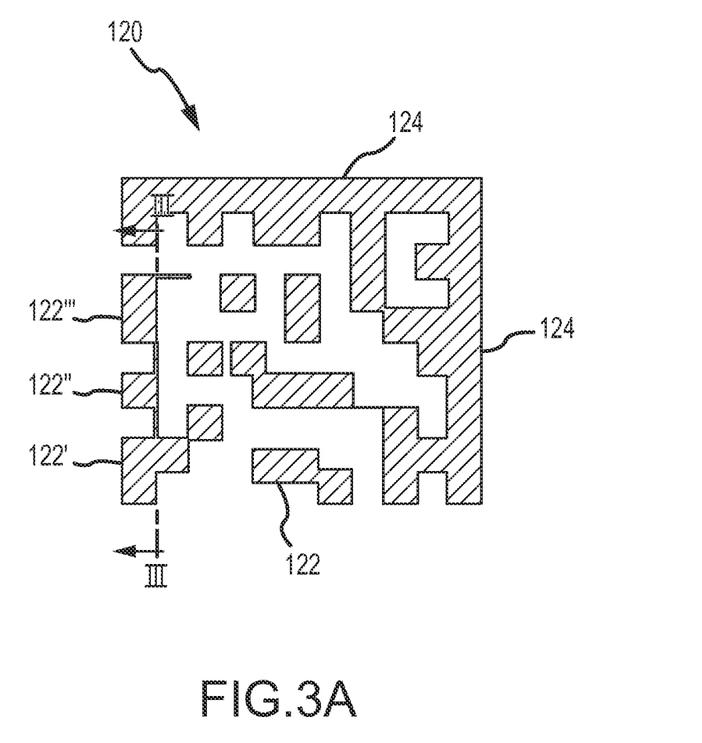
FIG. 3A illustrates an example laser ablated, three-dimensional code.

Turning to FIG. 3A, an example laser ablated code 120 that may be create in a surface of the electronic device 100 is illustrated. The laser ablated code 120 includes multiple different elements 122. As with the pin-stamped code 110, the position of the elements 122 encodes information. Additionally, the depth of each element 122 encodes information. The laser ablated code 120 may be formed using any suitable laser and, in one embodiment, may be formed using a picosecond laser operating in or near the UV region of the electromagnetic spectrum. The laser may vary its frequency, speed, power level or other operating parameter to achieve a desired ablation depth upon creating the elements 122 of the code. That is, a higher power level and/or a slower speed (e.g., longer persistence on a particular spot) may result in more material ablating and a deeper aperture being formed to create an element of the code. In some embodiments, the frequency of a pulsing laser may be increased to achieve a higher power level (e.g., higher average power level). The frequency of the laser may, alternatively, be decreased to achieve a lower average power level.

The elements may be positioned according to a coding scheme to communicate information. Additionally, a pattern 124 or set of elements may be provided to help with alignment and orientation for proper reading of the code 120. In the illustrated example two sides of the code have a solid patterning for this purpose.

Figure 3B:
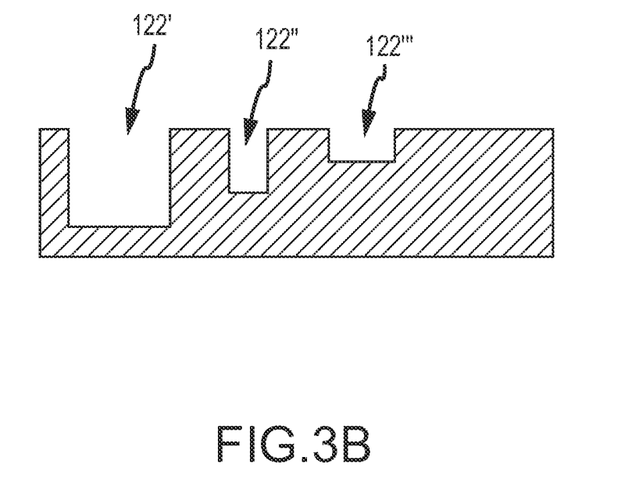
FIG. 3B is a cross-sectional view of the laser ablated, three-dimensional code taken along line III-III in FIG. 3A.

FIG. 3B is a partial cross-sectional view of the laser ablated code 120 taken along line III-III in FIG. 3A. As with the pin-stamped code 110, each of the elements 122 may have a different depth. The varied depths encode information. In FIG. 3B the element 122' is deeper than either elements 122" and 122'''. The laser ablation process may be much more precise than the mechanical machining process and therefore may allow for better control over the specific size of the elements 122 and their depths. Additionally, the size of each element may be much smaller than those formed by a mechanical technique. That is, the size of the elements formed through laser ablation may be a small as the focal point of the laser. In some embodiments, the diameter of the elements may be less than 20 microns. As such, an entire code may be less then 520 microns long.

Generally, the laser may ablate material to depths of less than approximately ten micrometers (e.g., approximately five micrometers or less). For example, the element 122''' may be approximately five micrometers deep, the element 122" may be approximately ten micrometers deep, and the element 122' may be approximately fifteen micrometers deep. In some embodiments, the depth of the elements may be greater or lesser, and the depth resolution of a reader, as well as the precision of laser ablation, may set the depth difference between discrete levels for encoding purposes.

Additionally, the elements 122 may be through-holes. That is, the elements 122 may entirely traverse the material in which they are formed. In some embodiments, all elements of a code may be through-holes, while in other embodiments one or more elements may be through-holes and others not. For example, element 122' may be a through-hole and elements 122" and 122''' not. The through-holes may constitute part of an existing micro-perforation element or pattern in the device housing. That is, the micro-perforation element may include a code and/or the micro-perforation may itself be a code. The through-holes allows rear-illumination of the code that may make it much easier to detect or "see" the code. In some embodiments, the through-holes may be through an entire thickness or a structure, as is the case in some current products, such as is the case for the sleep indicator light in Apple, Inc.'s MacBook Pro® notebook computers. Alternatively, the through-holes may be through a paint layer on a transparent part, such as an inked portion of a coverglass in a smart phone.

In some embodiments, the code may be located under or within certain features of the device 100. For example, the code may be located under or within a logo, such as the Apple logo 130. In particular, the code may be formed as microperforations that are sized so as to not be noticeable to the naked eye. In some embodiments, the code may be small enough to fit within a textual indicator printed on the housing. For example, the dot of the "i" in iPhone® be encoded with a 3-D code. The code may serve as pixels that form the dot. Utilizing a known feature, such as the dot on the "i", may help with locating the code and properly positioning or orienting a reader to read the code.

In still other embodiments, the code may be located in a sub-layer of the device's housing. That is, the code may not be located within or on an outermost layer of the device's housing. For example, in one embodiment, the code may be located on a layer under a portion of the cover glass 102. In particular, in some embodiments, the code may be located under a portion of the cover glass 102 that has been decorated with ink, such as the ink coated region 103. Locating the code in a sublayer may make the code difficult to notice and/or detect, especially when the code is located under an obscuring feature such as the ink layer.

Figure 4:
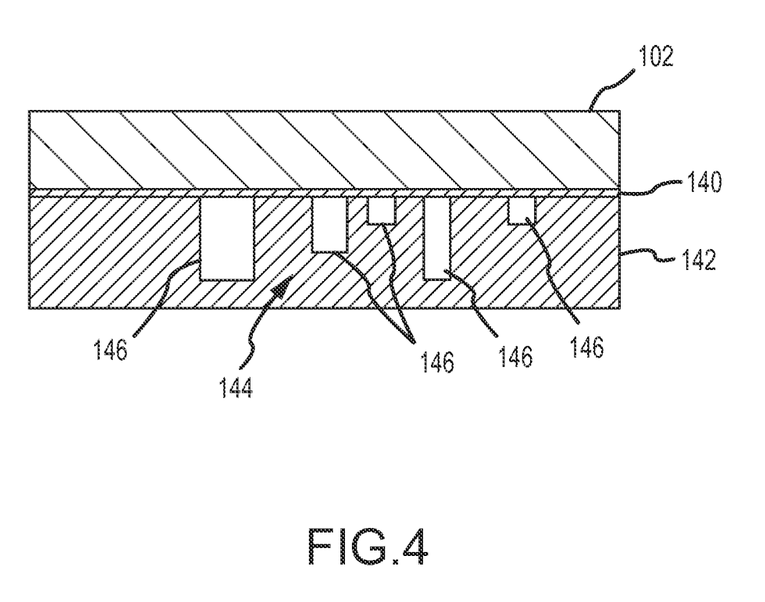
FIG. 4 is a cross-sectional view taken along line IV-IV of the electronic device illustrated in FIG. 1A.

FIG. 4 illustrates cross sectional view of the cover glass taken along line IV-IV in FIG. 1. As shown, the cover glass 102 has an ink layer 140 and a substrate layer 142 is located under the ink layer. The substrate layer 142 includes a 3-D code 144 having multiple elements 146 having varied depths. In some embodiments, the code elements 146 (e.g., apertures) may be left void, while in other embodiments, the elements may be filled with a material different from that of the substrate layer 142 and/or the cover glass 102. For example, the substrate layer 142 may be metallic and the elements 146 may be filled with a transparent material so that the depth of the elements may be ascertained by a reader.

In embodiments where the code is located under an obscuring feature such as the ink layer 140, the obscuring feature or a portion of it may be transparent to certain wavelengths of light. For example, the ink may generally block white light to prevent a user from seeing the code (e.g., the ink may be visibly opaque). However, the ink may also be transmissive in non-visible wavelengths (e.g., the ink may be IR or UV transmissive) so that a reader, such as one operating in the IR or UV region of the electromagnetic spectrum, may "see" through the ink layer and read the code 144. It should be appreciated that in some embodiments, the code 144 may be located in a portion of the sublayer that is not under or obscured by an ink layer or other obscuring feature. Further, in some embodiments, an incongruity, such as an empty space in the ink layer 140 may allow a reader to read the code 144. If the code 144 were formed using laser ablation techniques, the elements may be so small that only one or a few small dots may be created in the ink layer above the code to allow the code to be read without the reader operating in a particular portion of the electromagnetic spectrum. Further still, the small dots in the ink layer may be encoded such that they may communicate additional information.

In other embodiments, a substrate may be encoded and subsequently painted. The paint/ink may cover the encoded substrate and camouflage the code so that it may not be easily detected. That is, the paint may have a uniform color (e.g., black) such that incongruities in the paint layer may be generally indiscernible. In some embodiments, the paint layer may coat the surface of the substrate such that it appears smooth. The size of the elements of the code (e.g., depth and circumference of the elements) as well as the thickness of the paint layer will dictate the effectiveness of this technique. In each case, however, the paint/ink may be transparent to certain wavelengths of light such that the code may be read.

Figure 5:
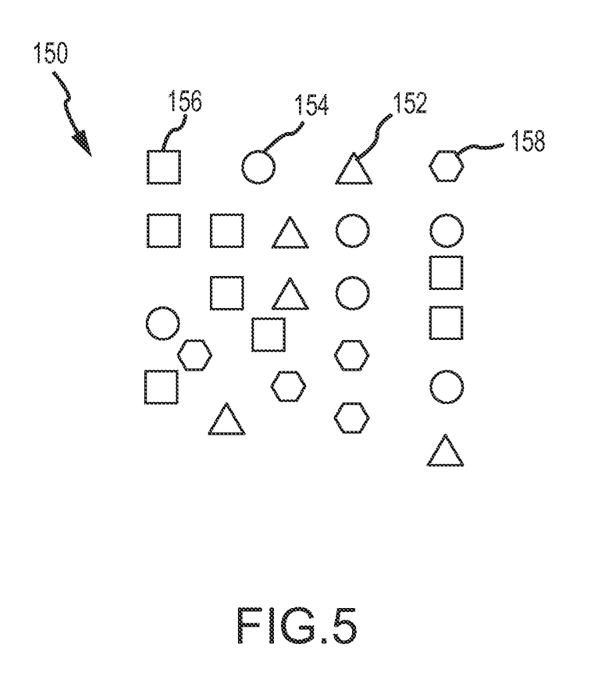
FIG. 5 illustrates an example three-dimensional code including shape based encoding.

The 3-D codes may also be encoded based on the shape of the elements. FIG. 5 illustrates a 3-D code 150 that utilizes multiple different shapes within the code. Specifically, some elements may take the form of triangles 152, circles 154, squares 156 and hexagons 158, for example. Each different shape may represent certain information. Furthermore, the shape may represent different information depending on its location and/or depth. As such, the shapes, their position, and their depths may all be used to communicate information and, furthermore, the information communicated by each different parameter of the element may be relative to one or more of the other parameters. In some embodiments, the shape of the elements is consistent throughout the aperture forming the element. That is, the aperture is the encoded shape and the shape may be imperceptible to the naked eye.

Figure 6A:
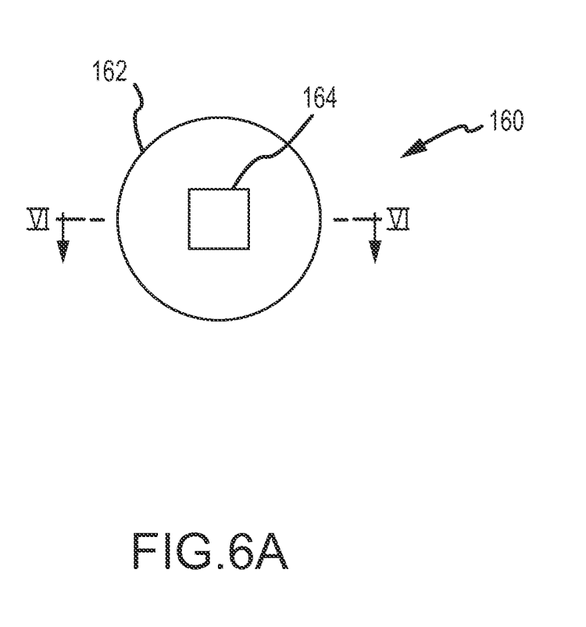
FIG. 6A is a top view of a circular code element of a three-dimensional code with a square shape encoded on its bottom surface.
Figure 6B:
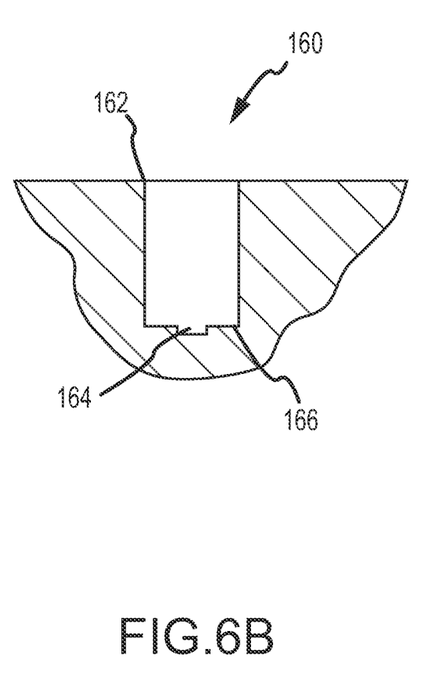
FIG. 6B is a cross-sectional view taken along line VI-VI of the circular code element of FIG. 6A.

In other embodiments, all or some of the apertures may have the same shape and only a base or bottom of the aperture may have an encoding shape. Specifically, for example, all of the elements may appear on the surface to be circular. A bottom surface of one or more elements may have a shape or other information communicating symbols, such as a square. FIG. 6A illustrates a top view of a single element 160 having a circular shape 162 with a square 164 on its bottom surface 166. FIG. 6B shows a cross-sectional view of the element 160 taken along line VI-VI. As may be seen, the square 164 is on the bottom surface 166 of the circular shaped element 160. A superficial scan of the element 160 (or the code in which the element is used) would not detect either the depth of the element 160 or the shape on the bottom surface 166. As such, multiple encoded informational points would be unavailable and the code may not be properly decoded.

In some embodiments, a machined 3-D code may be further encoded with a laser ablated code. For example, the device 100 may be pin-stamped with a code such as code 110 with multiple elements 112 of the code being encoded with varied depth. A laser may then be used to ablate a bottom surface of one or more of the elements 112. As such, a laser ablated code, such as code 120, may be located within an element 112 of the pin-stamped code 110. Each of the different codes may be used to communicate different information. In other embodiments, the codes may be used together to communicate a single, cohesive block of information.

The codes may be read using one or more different techniques. Each technique is capable of determining the spatial relationship of the code elements as well as their depth. Further, the reading techniques may be able to determine shapes of the elements. With larger codes, that is code that have a relatively large footprint (e.g., one inch square), a line scanner and time of flight techniques, triangulation with multiple cameras, structured light techniques, and so forth may be used to read the codes. The larger codes may be formed through either mechanical techniques or laser ablation techniques.

The line scanners generally may be obtained off the shelf and configured to scans surfaces for element position and depth. Depth may be determined in part based on a time of flight calculation which correlates the depth to a length of time that the light emitted from the scanner travels. More specifically, the data from line scanner may be used to generate a point cloud representing the surface of the encoded material in 3-D space. The points of the point cloud may be used to determine the depth and position of the elements within the code.

The triangulation techniques may be implemented with at least two offset cameras that obtain images of the surface. The images may be provided to a computing device operating software that triangulates the image data to determine depths and spatial relationships of the elements of the 3-D code. The structured light techniques may project a light image having multiple lines, typically parallel, onto a surface. The distance of the surface from the projecting device may be determined based upon a separation between the parallel lines; closer lines indicate that the surface is closer to the projecting device.

With codes that are on a smaller scale, such as those having depth differentials of five micrometers or elements having diameters of approximately twenty micrometers, other reading techniques may be implemented. For example, scanning microscopes, confocal microscopes, interferometers, dark field illumination techniques, bright field techniques, and so forth, may be implemented. Generally, the dark field illumination techniques may be implemented to achieve higher contrast levels on a surface that is not level, such as one in which a laser ablated code has been placed. Bright field techniques focus on features that are less reflective of incident light and/or those regions of a surface where shadows are cast.

The code reading devices may be configured to locate the 3-D codes. This may be helpful when a code is behind an obscuring object or too small to be seen with the naked eye. In locating the codes, the reading device may implement optical recognition techniques to recognize certain features of the electronic device 100 and orient itself relative to the device. For example, the reading devices may be find an edge of the device or a button and utilize the codes relative position to the found edge or button to find the code. For example, in one embodiment, the 3-D code may be located within a graphical element 107 of the button 105. The reader may, therefore, look for the button 105 and/or the graphical feature 107 prior to attempting to read or scan for a code.

The present techniques provide the ability to encode additional information into codes using a depth parameter of elements, a shape of the elements and/or features located in the bottom of the elements. These 3-D codes with depth variability, along with the other parameters, increases the information density of the codes. That is, the codes may contain more information than conventional codes, such as bar codes and QR codes. Further, laser ablation techniques for creation of the codes provides codes that may be too small to be seen. Thus, dense codes with no visible footprint may be provided.

The foregoing describes some example embodiments for creating, obscuring and reading 3-D codes. Although the foregoing discussion has presented specific embodiments, persons skilled in the art will recognize that changes may be made in form and detail without departing from the spirit and scope of the embodiments. For example, a machine other than a pin-stamper may create a mechanically created code. Furthermore, the 3-D code may be made to appear as a one or two dimensional code, but also includes a depth parameter. Accordingly, the specific embodiments described herein should be understood as examples and not limiting the scope thereof.

The invention claimed is:

1. A 3-D code comprising:
   a plurality of apertures formed within a substrate, wherein:
   each aperture comprises a unique position in the 3-D code relative to each of the other apertures;
   each aperture comprises a depth, wherein at least one aperture has a depth that is different from at least one other aperture's depth;
   at least one of said plurality of apertures includes a first geometric shape; and
   said at least one of said plurality of apertures includes an encoding geometric shape formed on a bottom surface of said at least one aperture; and
   the encoding geometric shape encodes information.

2. The 3-D code of claim 1, wherein the plurality of apertures represent at least two different geometric shapes.

3. The 3-D code of claim 1, wherein a diameter of each of the plurality of apertures is approximately 20 micrometers or less.

4. The 3-D code of claim 1, wherein a depth of at least one of the apertures is approximately less than 10 micrometers.

5. The 3-D code of claim 1, wherein the code is a pin-stamped code and the pin-stamped code comprises at least one aperture having an encoded feature on its bottom surface.

6. The 3-D code of claim 5, wherein the encoded feature comprises a secondary 3-D code.

7. The 3-D code of claim 1, wherein the code is too small to be seen by a naked eye.

8. The 3-D code of claim 1, wherein the code forms part of a microperforated portion of a housing.

9. The 3-D code of claim 1, wherein at least one aperture comprise a through-hole.

10. The 3-D coding of claim 1, wherein the code is obscured within one of a printed logo and a printed letter.

11. A method of reading a 3-D code in a substrate, the substrate including a surface, said method comprising:
    determining a relative location of a reader and a device having a 3-D code;
    orienting the reader relative to the device to enable reading of the 3-D code;
    obtaining an image of the 3-D code;
    processing the image to determine a relative location of each element of the 3-D code; and
    determining a depth of each element of the 3-D code, said depth extending into said substrate below said surface, at least one element of the 3-D code including a different depth from a second element of the 3-D code, said different depth comprising encoded data; wherein
    the 3-D code forms part of a microperforated portion of a housing on an electronic device.

12. The method of claim 11, wherein the step of determining a relative location of the reader and the device comprises utilizing an image recognition software to discern features of the device.

13. A 3-D code comprising:
    a plurality of apertures formed within a substrate wherein the code forms part of a microperforated portion of a housing on an electronic device, and wherein:
    each aperture comprises a unique position in the 3-D code relative to each of the other apertures; and
    each aperture comprises a depth, wherein at least one aperture has a depth that is different from at least one other aperture's depth, said different depth comprising encoded data.

14. The 3-D code of claim 13, wherein at least one of the plurality of apertures has a first geometric shape and a second geometric shape is formed on a bottom surface of the aperture.

15. The 3-D code of claim 13, wherein the code is a pin-stamped code and the pin-stamped code comprises at least one aperture having an encoded feature on its bottom surface.

16. The 3-D code of claim 15 wherein the encoded feature comprises a secondary 3-D code.

17. The 3-D code of claim 13, wherein at least one aperture comprises a through-hole.

\* \* \* \* \*